(12) United States Patent
Malach (10) Patent No.: US 10,764,417 B1
(45) Date of Patent: Sep. 1, 2020

(54) DUAL MOBILE UTILITY AND TRANSPORTATION DEVICE

(71) Applicant: Anthony Malach, Los Angeles, CA (US)

(72) Inventor: Anthony Malach, Los Angeles, CA (US)

( * ) Notice: Subject to any disclaimer, the term of this patent is extended or adjusted under 35 U.S.C. 154(b) by 0 days.

(21) Appl. No.: 16/703,198

(22) Filed: Dec. 4, 2019

(51) Int. Cl.
*H04M 1/04* (2006.01)
*H04B 1/3888* (2015.01)

(52) U.S. Cl.
CPC ............ *H04M 1/04* (2013.01); *H04B 1/3888* (2013.01)

(58) Field of Classification Search
CPC .. H04M 1/04; H04M 1/0264; H04M 2250/52; H04M 1/026; H04B 1/3888
USPC ...................................................... 455/575.1
See application file for complete search history.

(56) References Cited

U.S. PATENT DOCUMENTS

| | | | | |
|---|---|---|---|---|
| 6,360,083 B1* | 3/2002 | Fan | ..................... | B60R 11/0217 455/575.1 |
| 8,936,222 B1* | 1/2015 | Bastian | ..................... | A45F 5/00 224/183 |
| 9,427,070 B1* | 8/2016 | Bastian | ..................... | A45F 5/02 |
| 9,762,280 B1* | 9/2017 | Munn | ..................... | H04M 1/04 |
| 9,924,782 B1* | 3/2018 | Burke | ..................... | A45C 13/26 |
| 2019/0129469 A1 | 5/2019 | Bacallo | | |

* cited by examiner

*Primary Examiner* — Eugene Yun
(74) *Attorney, Agent, or Firm* — Sanchelima & Associates, P.A.; Christian Sanchelima; Jesus Sanchelima (57) ABSTRACT

A system for a dual mobile utility and transportation device including a clamping frame assembly and a plate assembly is disclosed. The system results in a dual cellphone device for the usage and transportation the cellphone simultaneously. There is at least one of clamping frame assembly and plate assembly to couple multiple phones together. There is a first horizontally adjustable clamping frame having a bottom plate with integral mounting magnets. Also, a second horizontally adjustable clamping frame having a bottom plate with integral mounting magnets as well. The mounting magnets of the first horizontally adjustable clamping frame engage the mounting magnets of the second horizontally adjustable clamping frame to couple multiple mobile devices together. Coupling of the mobile devices can be done at different angles, even perpendicularly to allow for cameras of the mobile devices to be usable without any obstructions. The system functions with mobile devices of different dimensions.

15 Claims, 8 Drawing Sheets

DUAL MOBILE UTILITY AND TRANSPORTATION DEVICE

BACKGROUND OF THE INVENTION

1. Field of the Invention

The present invention relates to a dual mobile utility and transportation device and, more particularly, to a dual mobile utility and transportation device that allows for the coupling of multiple mobile devices for allowing a user to comfortably access, use, or transport multiple mobile devices simultaneously in an efficient manner. The convenience of transporting multiple and separate mobile devices also helps to prevent lost or misplaced mobile devices.

2. Description of the Related Art

The dual mobile utility and transportation device includes a first horizontally adjustable clamping frame having both a bottom plate with integral mounting magnets, and a second horizontally adjustable clamping frame having a bottom plate with integral mounting magnets. Wherein the magnets of the first clamping frame and the second clamping frame are of opposite polarity. The device allows a user to use and transport multiple mobile devices at once comfortably, more specifically, two mobile devices. The device further allows full functionality of the mobile devices, even of the camera. Further, the case allows for carrying of different size mobile devices.

Applicant believes that a related reference corresponds to U.S. patent No. 2019/0129469 for a mobile device cradle for interlacing two different mobile devices. Applicant believes another related reference corresponds to U.S. Pat. No. 9,762,280 for portable mobile phone holders and methods for operating at least two mobile phones. None of these, references, however, teach of a dual mobile utility and transportation device that couples at least two mobile devices together for ease of portability. Further, none of these references teach of the use of magnets which make for quick release of the coupling of the mobile devices. Additionally, the magnets allow for rotation of the mobile devices in relation to one another for the purpose of still being able to use the cameras in the mobile devices while using the present invention.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a dual mobile utility and transportation device that allows for coupling of multiple mobile devices at once, more specifically, of two mobile devices at once.

It is another object of this invention to provide a dual mobile utility and transportation device that can hold mobile devices of different dimensions.

It is still another object of the present invention to provide a dual mobile utility and transportation device that permits full functionality of the mobile device, especially the camera, even while in the mobile device carrying case.

It is another object of the present invention to provide a dual mobile utility and transportation device that allows for the simultaneous transportation of multiple mobile devices at once.

It is still another object of the present invention to provide a dual mobile utility and transportation device that reduces the loss or misplacement of mobile devices.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, where the present invention is generally referred to with numeral 10, it can be observed that it, a dual mobile device apparatus 10, basically includes a clamping frame assembly 20 and a plate assembly 40.

It should be understood that dual mobile device apparatus 10 can be sized to accommodate electronic devices of different dimensions. The present invention can be sized for different devices with clamping frame assembly 20. It should be understood that the present invention may include more than one of frame assembly 20 and plate assembly 40. Each of a mobile device 72 may use one of frame assembly 20 and plate assembly 40. Meaning that when two of mobile device 72 are coupled together then the present invention may include two of clamping frame assembly 20 and plate assembly 40. Clamping frame assembly 20 includes a first tray 21. In one embodiment, first tray 21 may be U-shaped. However, it should be understood that first tray 21 may be of predetermined dimensions and shape. It should also be understood that first tray 21 may be made of stainless steel, metal or other similar and suitable materials. First tray 21 includes a first leg 21a and a second leg 21b. First leg 21a and second leg 21b may be integral to one another. It should be understood that both of first leg 21a and second leg 21b may be identical but mirrored opposite to one another. First leg 21a and second leg 21b may have a substantially rectangular shape in one embodiment. Each of first leg 21a and second leg 21b may have protruding members 21c on one side of first leg 21a and second leg 21b. Protruding members 21c may be on an underside of first tray 21. In one embodiment, protruding members 21c may have a shape that is cylindrical. Along an inner edge of both first leg 21a and second leg 21b there may be a plurality of teeth 22 which may be jagged. In one embodiment, each of teeth 22 may be triangular shaped. Teeth 22 on first leg 21a may face inwardly towards teeth 22 on second leg 21b. A receiving space 23 may be defined as the space between first leg 21a and second leg 21b.

Mounted to first tray 21 may be a curved portion 28. Curved portion 28 may be adapted to allow for another of curved portion 28 to sit flush atop. Curved portion 28 allows for a closer fitting of additional clamping frame assembly 20 to be mounted flush and in a manner that is aesthetically pleasing. Curved portion 28 may aid to eliminate any space between multiple of clamping frame assembly 20 that are coupled together.

Mounted to curved portion 28 may be a grip holder 24. Grip holder 24 may be of a predetermined shape and dimensions. In one embodiment, grip holder 24 may be substantially rectangular, but taper towards one peripheral side. Extending along a length of grip holder 24 may be a plurality of grip openings 24a. Each of grip openings 24a may extend a width of grip holder 24. Grip openings 24a may be parallel to each other. Grip openings 24a may be oriented slanted on grip holder 24. It should be understood that grip openings 24a may be of different shapes and sizes as grip holder 24 may be of an irregular shape. Received in grip holder 24 may be a grip 25. Grip 25 may be of a shape and dimensions that cooperate with grip holder 24. Grip 25 may have two sides. Grip 25 may include a grip outer side 26 and a grip inner side 27. On grip outer side 26 may be hand grips 26a. Hand grips 26a may extend vertically and slanted across the length of grip 25. Hand grips 26a may be parallel to one another. Grip openings 24a may correspond with hand grips 26a. Grip openings 24a and hand grips 26a may be of dimensions and shapes that cooperate with one another. Grip 25 may be mounted to grip holder 24 by having hand grips 26a inserted through grip openings 24a. This secures grip 25 to grip holder 24. Hand grips 26a may be adapted to provide comfort to a user operating the present invention. Hand grips 26a further aid in allowing secure holding of the present invention by the user to reduce the chance of accidental drops. On grip inner side 27 there may be device grips 27a. Device grips 27a may extend horizontally across the length of grip 25. Device grips 27a may be parallel to one another. Device grips 27a may be adapted to allow for the present invention to securely hold mobile device 72 to reduce the chances of accidental dropping of mobile device 72. It should be understood that in one embodiment, first tray 21, grip holder 24 and curved portion 28 may be integral. In an alternate embodiment, first tray 21, grip holder 24 and curved portion 28 may be mounted to one another.

Figure 1:
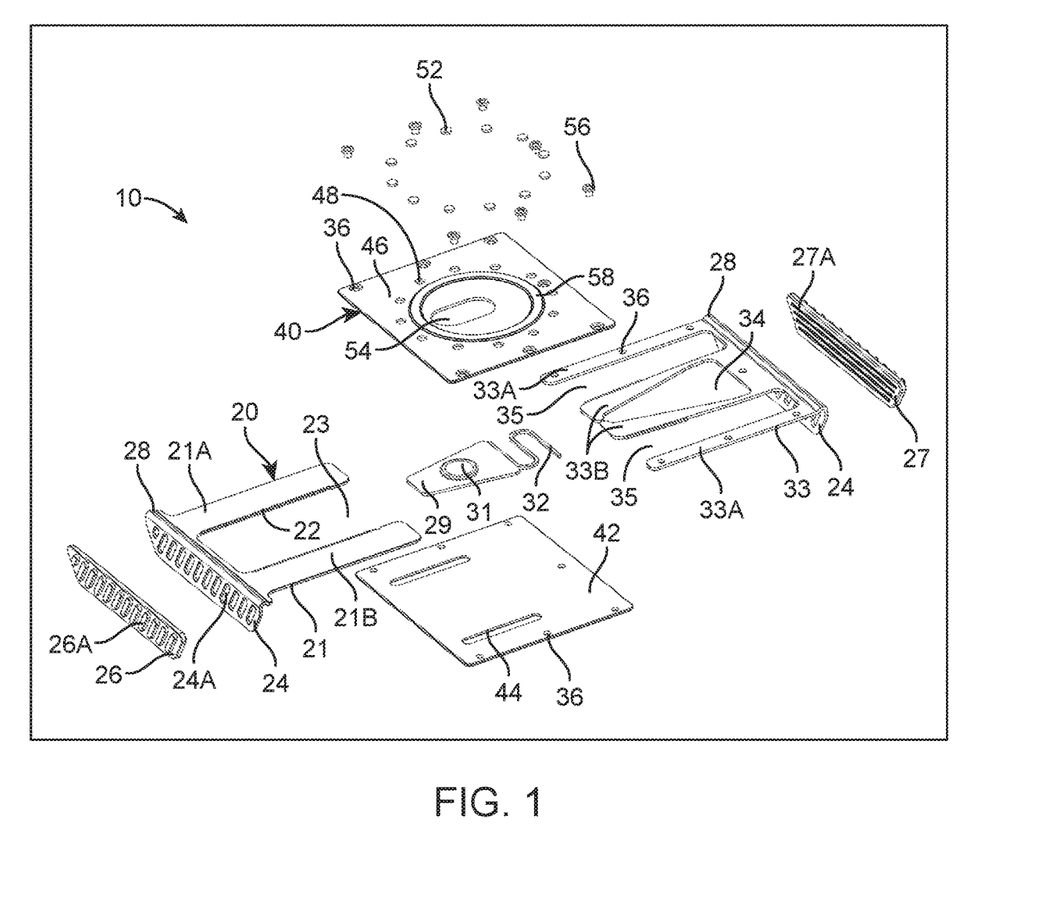
FIG. 1 represents an exploded view of the present invention.
Figure 2:
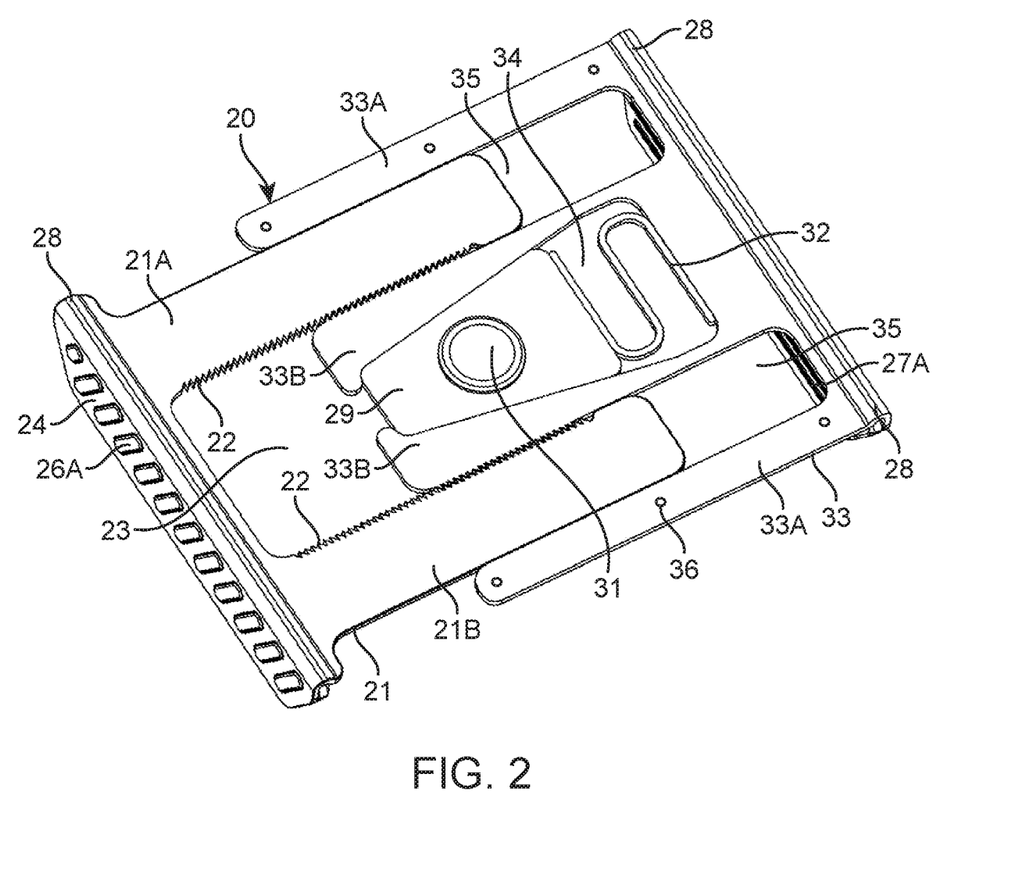
FIG. 2 shows the mechanism that allows the present invention to be sized for gripping different sized mobile devices.
Figure 3:
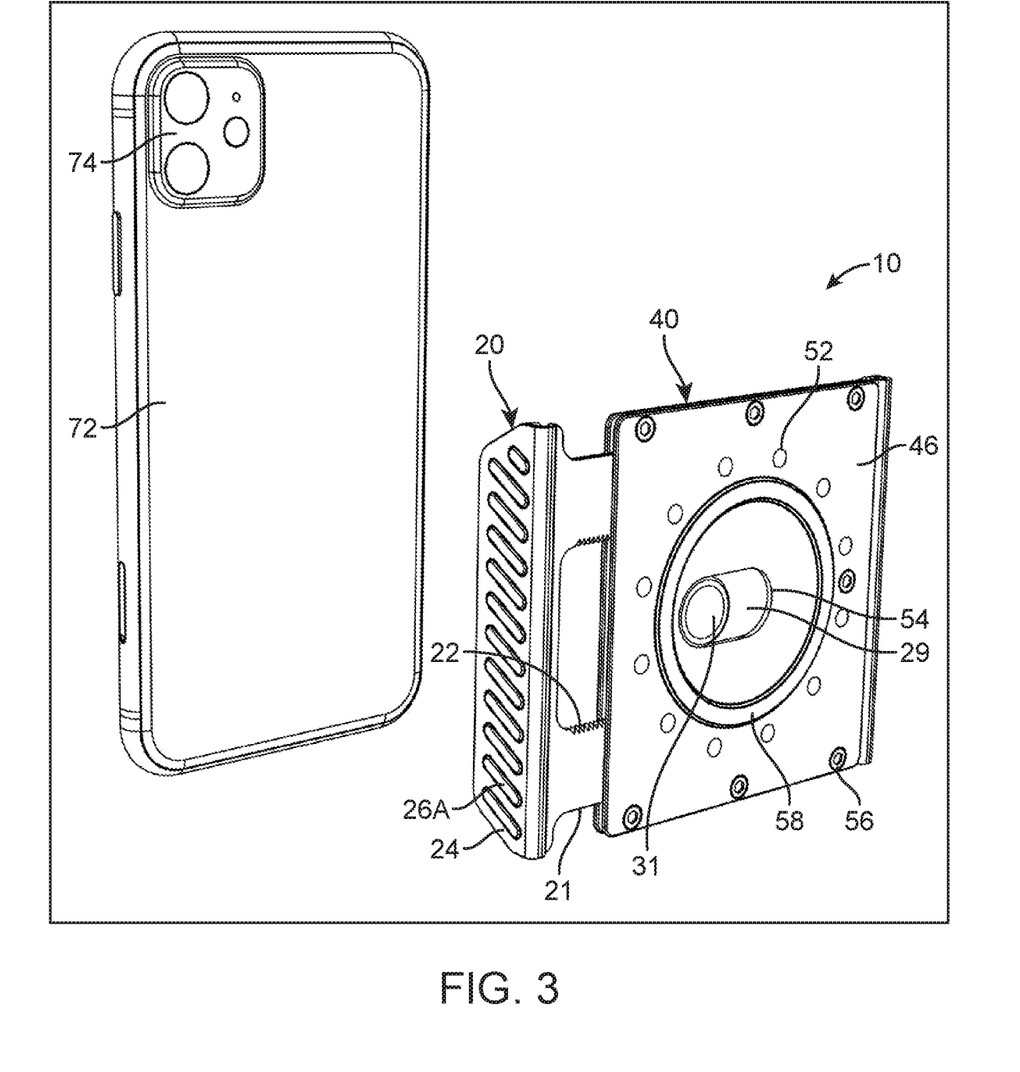
FIG. 3 illustrates the present invention being expanded to grip a mobile device.
Figure 4:
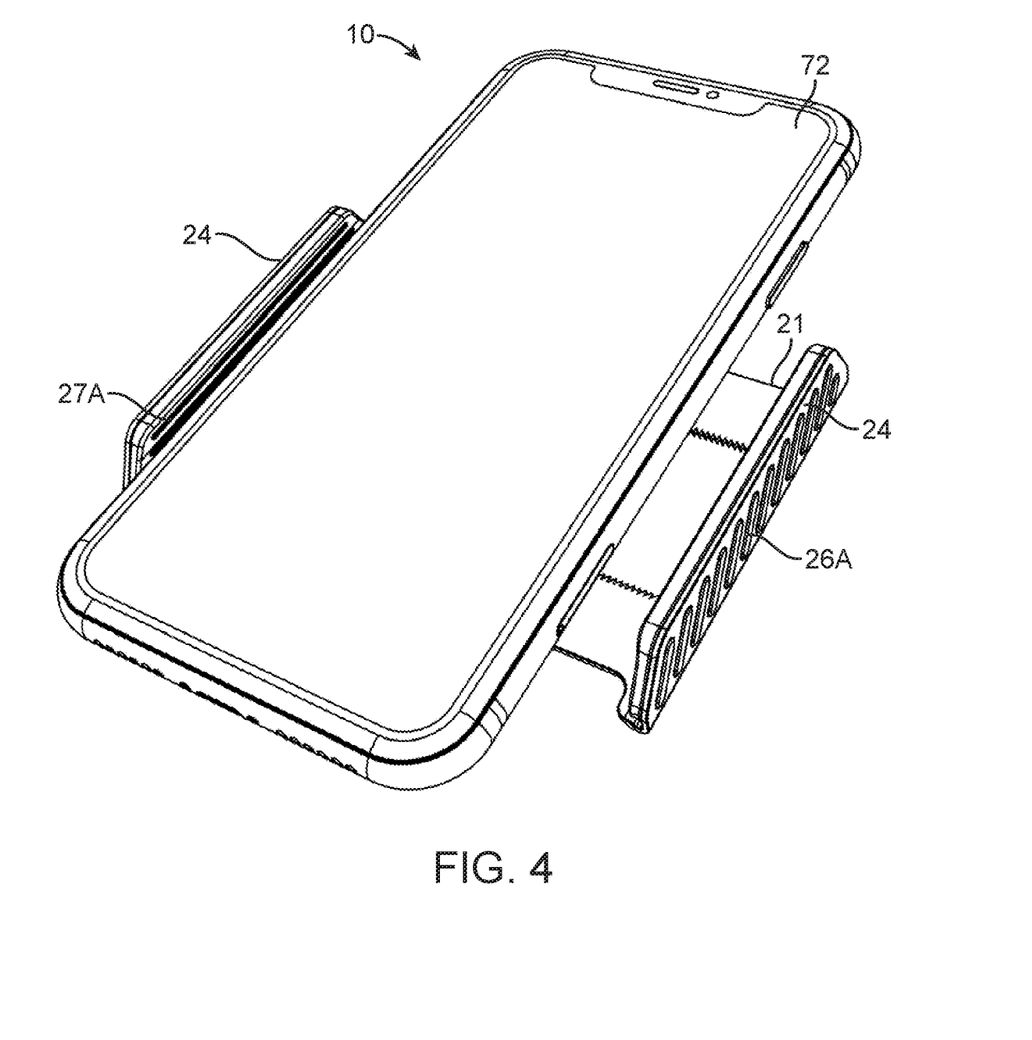
FIG. 4 represents the present invention gripping a mobile device.
Figure 5:
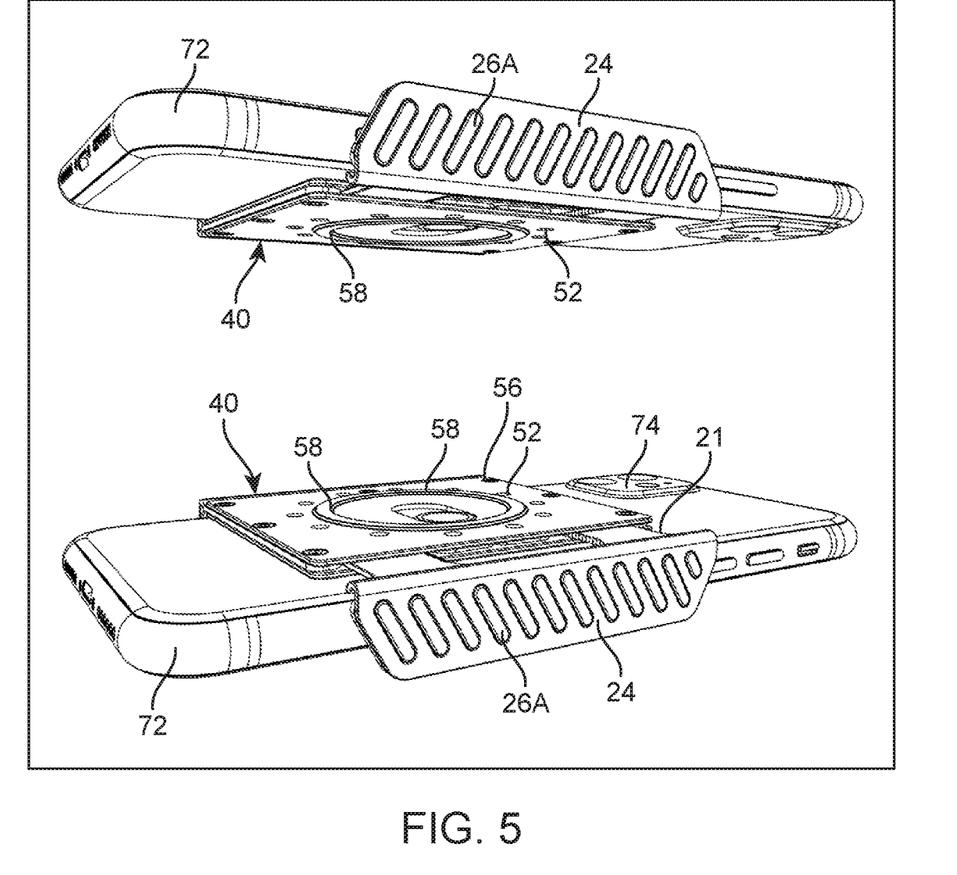
FIG. 5 shows two mobile devices engaged by the clamping frame assembly and aligned to allow for coupling of the two mobile devices together.
Figure 6:
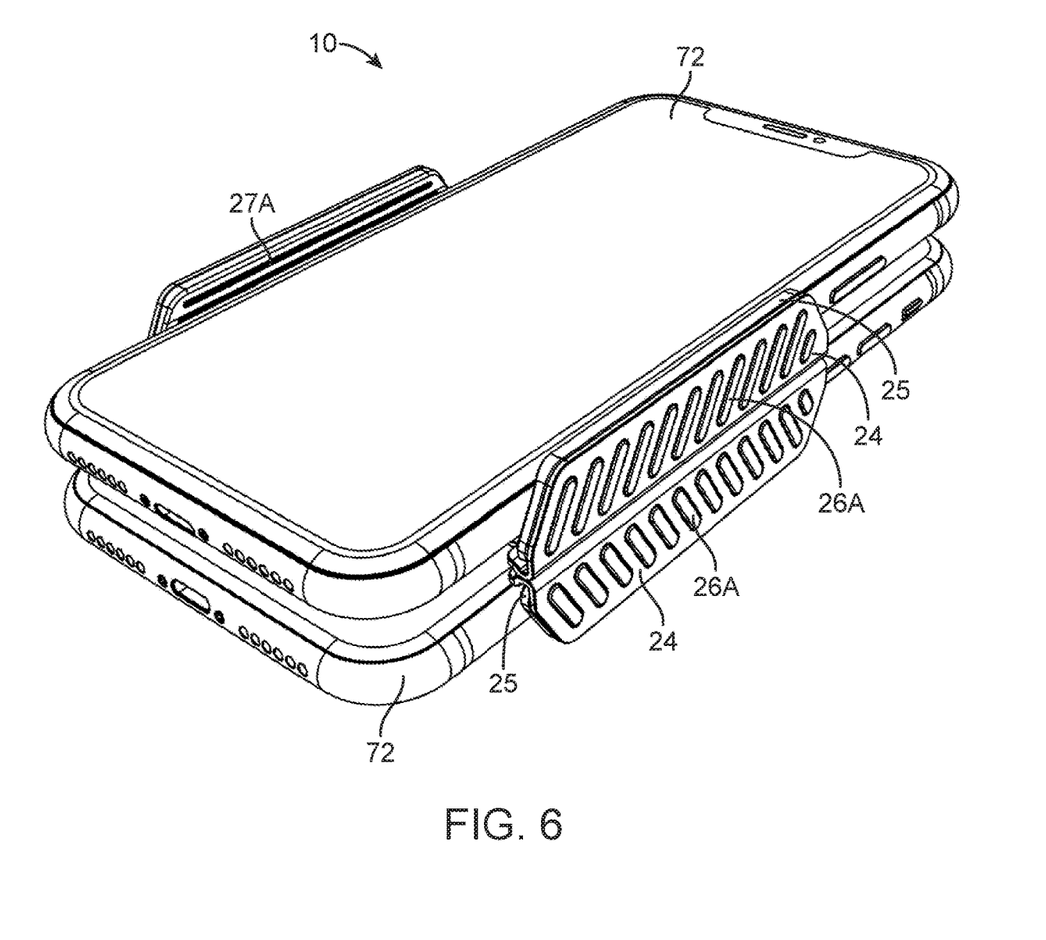
FIG. 6 illustrates two mobile devices, of the same size, coupled together by the present invention.
Figure 7:
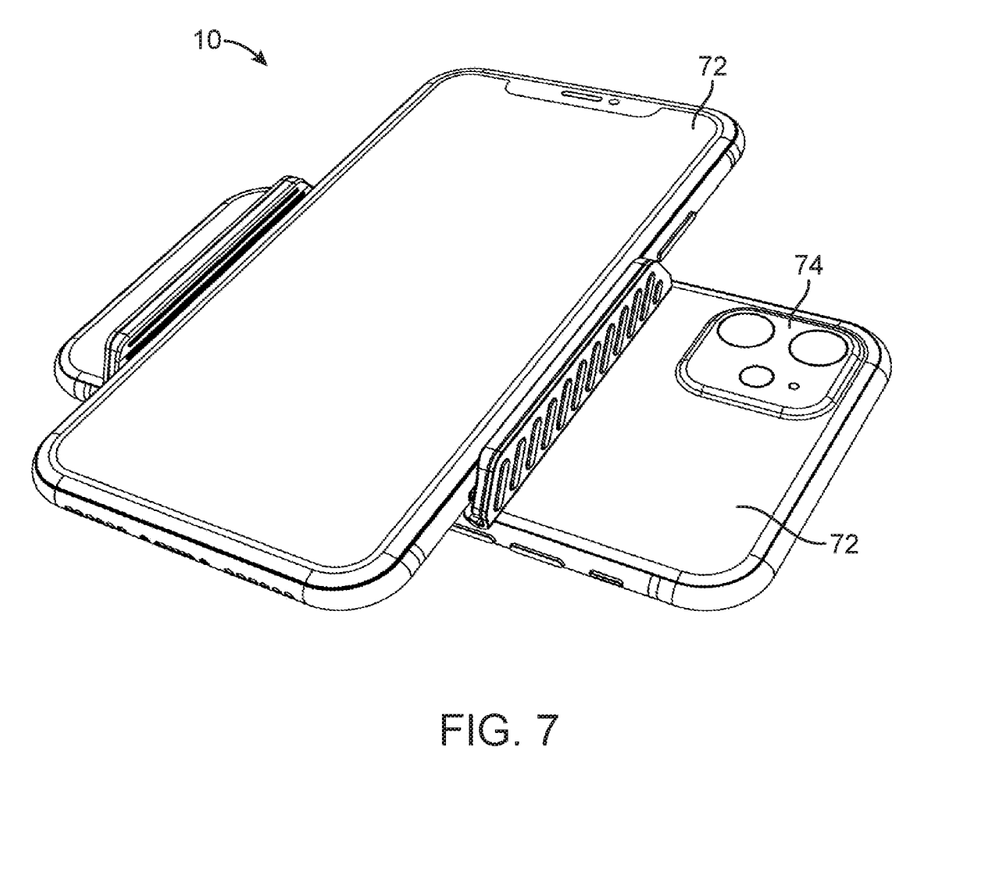
FIG. 7 is a representation of the present invention with one of the mobile devices secured within the present invention being rotated 90 degrees to allow for the usage of a rear camera on one of the mobile devices while remaining coupled to another mobile device.
Figure 8:
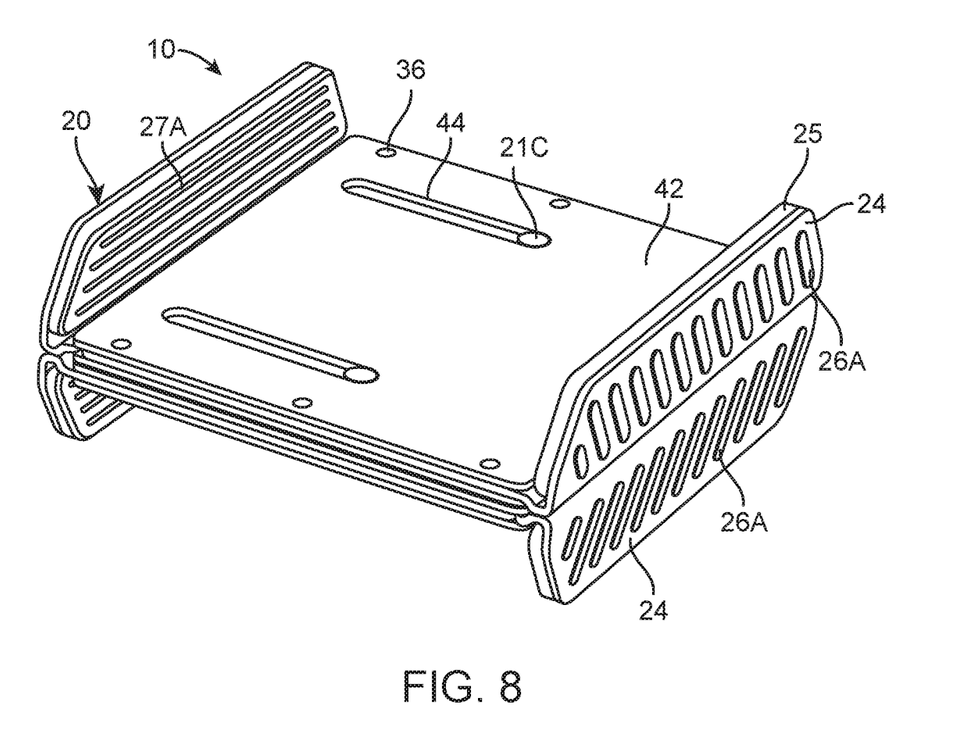
FIG. 8 shows the present invention ready for usage by two mobile devices, before being sized appropriately.

Clamping frame assembly 20 may further include a slider 29. Slider 29 may be of a predetermined shape and dimensions. In one embodiment, slider 29 may be tapered as seen in FIG. 1. Slider 29 may have a narrow end and a wide end. Mounted on slider 29 may be a finger receiving portion 31. Mounted to an end of slider 29 may be a spring 32. Spring 32 may be mounted to the end of slider 29 that is wider. Finger receiving portion 31 may be adapted to receive a finger of the user as they slide slider 29 to size the present invention to accommodate different sized of mobile device 72. Slider 29 may be slightly recessed. In one embodiment, finger receiving portion 31 may be circular. Finger receiving portion 31 may include a ring around a circumference of finger receiving portion 31. The ring may be flush with slider 29. Spring 32 may be adapted to expand and compress. In the resting position, spring 32 may be expanded. When slider 29 is actuated spring 32 may be compressed. In one embodiment, as seen in FIG. 1, spring 32 may be S shaped. Slider 29 and spring 32 may be on a same plane.

It can be seen that clamping frame assembly 20 further includes a second tray 33. In one embodiment, second tray 33 may be substantially W shaped. It should be understood that first tray 21, slider 29 and second tray 33 cooperate with one another. Second tray 33 may include outer legs 33a and inner legs 33b. In one embodiment, outer legs 33a and inner legs 33b may be integral. The present invention may include two of outer legs 33a on the peripheral sides of second tray 33. Outer legs 33a may be substantially rectangular shaped, in one embodiment. Outer legs 33a may be thinner than first leg 21a and second legs 21b. At predetermined locations on outer legs 33a may be fastener openings 36. In between outer legs 33a may be inner legs 33b. Inner legs 33b may be of an irregular shape that tapers. Inner legs 33b may be adapted to move outwardly and inwardly in order to allow sizing of the present invention for different size of mobile device 72. Along outer or outside edges of inner legs 33b teeth 22 may extend a predetermined distance along inner legs 33b. Teeth 22 on inner legs 33b may face outwardly towards one of outer legs 33a nearest to each of inner legs 33b. Teeth 22 on first leg 21a and second leg 21b may cooperate with teeth 22 on outer legs 33b to have first tray 21 engage second tray 33. The space between inner legs 33b may be defined as a slider receiving space 34 adapted to hold slider 29 and spring 32 therebetween. Slider receiving space 34 may be of a shape and dimensions that cooperates with slider 29 and spring 32. There may be a space between each of outer legs 33a and inner legs 33b that may be defined as a first tray receiving space 35. Thereby meaning that there may be two of first tray receiving space 35 in the present invention. Each of first tray receiving space 35 may receive one of first leg 21a or second leg 21b. Receiving space 23 may be adapted to receive inner legs 33b therebetween. Receiving space 23 and first tray receiving space 35 permit first tray 21 and second tray 33 to engage one another. Once first tray 21 and second tray 33 have engaged one another, teeth 22 on first tray 21 and second tray 33 may engage one another.

It should further be understood that second tray 33 may include grip holder 24, grip 25 and a curved portion just as first tray 21. It should be understood that in one embodiment, second tray 33, grip holder 24 and curved portion 28 may be integral. In an alternate embodiment, second tray 33, grip holder 24 and curved portion 28 may be mounted to one another. Grip outer side 26 on first tray 21 and second tray 33 may face away from one another. While grip inner side 27 on first tray 21 and second tray 33 may face towards one another.

The present invention may further include plate assembly 40. Plate assembly 40 may be adapted to allow coupling of multiple of mobile device 72 together, more specifically of at least two of mobile device 72. Plate assembly 40 includes a top plate 42. Top plate 42 may make contact with mobile device 72 as it is secured by the present invention. It should be understood that mobile device 72 may extend between grip holder 24 of first tray 21 and second tray 33. Top plate 42 may include slots 44. In one embodiment, slots 44 may be parallel to each other. Slots 44 may be of a predetermined shape and dimensions. Slots 44 may also be located on predetermined locations on top plate 42. In one embodiment, slots 44 may be oblong. The present invention may include two of slots 44, but it should be understood that any other number of slots 44 may be suitable. The number of protruding members 21c and slots 44 may corresponds with each other. Each of slots 44 is to receive one of protruding members 21c. Slots 44 may be adapted to receive protruding members 21c of first tray 21. As the present invention is being sized, protruding members 21c may slide along slots 44. In one embodiment, protruding members 21c may slide along slots 44 towards a center of top plate 42 as the present invention is being adapted for smaller of mobile device 72. While, in one embodiment, protruding members 21c may slide along slots 44 away from a center of top plate 42 as the present invention is being adapted for larger of mobile device 72. Top plate 42 may further include fastener openings 36. Fastener openings 36 on top plate 42 may correspond with fastener openings 36 on second tray 33. Plate assembly 40 may also include a bottom plate 46. Bottom plate 46 may include a plurality of magnet openings 48. Magnet openings 48 may be of a predetermined shape and dimensions. It should be understood that magnet openings 48 may be positioned on bottom plate 46 in a circular configuration. Magnet openings 48 are to receive mounting magnets 52 therein. Bottom plate 46 may further include a slider slot 54 towards a center thereof. In one embodiment, slider slot 54 may oblong. Slider slot 54 may be adapted to receive slider 29. Slider 29 may slide along slider slot 54 when engaged by the user in order to size the present invention for different sized of mobile device 72. Bottom plate 46 may also include fastener openings 36. Fastener openings 36 on bottom plate 46 may correspond with fastener openings 36 on second tray 33 and top plate 42. Importantly, bottom plate 46 includes a ring 58. Ring 58 may be centrally located on bottom plate 46. Ring 58 may be recessed or raised on bottom plate 46. Slider slot 54 may be located between ring 58. Magnet openings 48 and mounting magnets 52 may be located around an outside perimeter of ring 58. Once second tray 33, top plate 42 and bottom plate 46 have been aligned, then fasteners 56 may be inserted through the fastener openings 36 located on each in order to secure second tray 33, top plate 42 and bottom plate 46 together. When second tray 33, top plate 42 and bottom plate 46 have been secured together, only first tray 21 may be movable, preferably, inwardly and outwardly for sizing that cooperates with the dimensions of mobile device 72. Inward movement of first tray may make the present invention smaller and outward movement of first tray 21 may make the present invention expand or larger. In an alternate embodiment, fasteners 56 may be grommets.

In order to size the present invention for mobile device 72 of different dimensions clamping frame assembly 20 is may be used. Once clamping frame assembly 20 is fully assembled, teeth 22 on first tray 21 and second tray 33 may be engaged to one another. If the user wishes to expand or retract mounting assembly 20. Slider 29 may be actuated by having the user move finger receiving portion 31 along slider slot 54. This results in slider 29 moving within slider receiving space and spring 32 compressing. The compression of spring 32 allows for teeth 22 of first tray 21 and second tray 33 to disengage as inner legs 33b move inwardly towards one another. Inner legs 33b may come in contact with one another. This then allows for first tray 21 to be slid outwardly to achieve a desired size for mobile device 72.

Once the desired size is achieved, finger receiving portion 31 may be released in order for slider 29 to be in a resting position and spring 32 to fully expand. With slider 29 in the resting position, inner legs 33b are separated by slider 29 and pushed outwardly for teeth 22 of outer legs 33a and inner legs 33b to become engaged with one another again to secure the present invention at a required dimension for mobile device 72.

Once the present invention has been assembled, it should be understood that second tray 33, top plate 42 and bottom plate 46 may remain fixed with fasteners 56 and first tray 21 may be movable to allow the present invention to be sized to accommodate different sized of mobile device 72. It should be understood that the present invention may include more than one of clamping frame assembly 20 and plate assembly 40. Each of mobile device 72 requires the use of clamping frame assembly 20 and plate assembly 40. Resulting in the present invention being a dual phone case. Clamping frame assembly 20 and plate assembly 40 for mobile device 72 being a first mobile device is a first horizontally adjustable clamping frame. While another of clamping frame assembly 20 and plate assembly 40 for mobile device 72 being a second mobile device is a second horizontally adjustable clamping frame. First horizontally adjustable clamping frame and second horizontally adjustable clamping frame may engage one another to couple the first mobile device and the second mobile device using mounting magnets 52 being integral mounting magnets located on bottom plate 46. It should be understood that mounting magnets 52 on first horizontally adjustable clamping frame and second horizontally adjustable clamping frame are of opposite polarity. Further, ring 58 on first horizontally adjustable clamping frame may be raised and ring 58 on second horizontally adjustable clamping frame may be recessed or vice versa. Thereby allowing for ring 58 on first horizontally adjustable clamping frame and second horizontally adjustable clamping frame to engage one another.

Once the first horizontally adjustable clamping frame and second horizontally adjustable clamping frame are mounted together with one of mobile device 72 being secured within, first mobile device and second mobile device, respectively, both of mobile devices 72 may be parallel to each other. The present invention allows for each of mobile device 72 to maintain full functionality. In order to use a camera 74 of mobile device 72, the present invention may hold two of mobile device 72 perpendicularly. Camera 74 may preferably be a rear camera or a camera on a rear surface of mobile device 72. For example, mobile device 72 being the first mobile device secured within first horizontally adjustable clamping frame may be vertical while mobile device 72 being the second mobile device secured within second horizontally adjustable clamping frame may be horizontal. This allows for camera 74 to be clear of obstructions in order to take pictures as desired. The orientation of one mobile device 72 with respect to another of mobile device 72, is achieved through mounting magnets 48 and ring 58. Both of mobile device 72 start parallel to each other. First horizontally adjustable clamping frame and second horizontally adjustable clamping frame start parallel to each other as. Then when there is a need to use camera 74, one of mobile device 72 may be rotated, preferably about 45 degrees. The rotation of one of mobile device 72 is assisted by mounting magnets 52 and ring 58. One of mobile device 72 is rotated until mounting magnets 52 disengage and mobile device 72 continues to rotate until mounting magnets 52 become engaged once again. During which ring 58 guides the rotation to ensure that engagement takes place once again hence the need for one of ring 58 to be raised and another of ring 58 to be recessed so they are both engaged at all times. It should be understood that mounting magnets 52 allow for orienting of the first mobile device and the second mobile device at predetermined angles in relation to one another.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a dual mobile device apparatus, comprising:
   a. at least two mobile devices each of said at least two mobile devices having cameras on a rear side thereof;
   b. a clamping frame assembly including a first tray having a first leg and a second leg, said first tray including a plurality of teeth mounted to said first leg and said second leg, said first tray having a receiving space, said receiving space defined as the spacing in between said first leg and said second leg;
   c. said clamping frame assembly further including a slider, said slider having a first end and a second end, said first end facing said first tray, said second end facing away from said first tray, said slider having a finger receiving portion mounted thereon, said finger receiving portion adapted to receive the finger of the user that is engaging said slider, a spring mounted to said second end of said slider, said spring being able to compress and expand;
   d. said clamping frame assembly further including a second tray, said second tray including outer legs and inner legs, said inner legs including said plurality of teeth, said slider receiving space adapted to receive and secure said slider and said spring therein, said first tray and said second tray being mounted together when said plurality of teeth on said inner legs engage said plurality of teeth on said first and second leg, said slider being actuated to compress said spring to allow said slider to move within said slider receiving space to disengage said first tray and said second tray;
   e. a plate assembly, said plate assembly including a top plate and a bottom plate, said bottom plate including a ring centrally located thereon, said bottom plate including magnet openings configured about and around said ring, said bottom plate further including mounting magnets received within said magnet openings, said bottom plate also having a slider slot for receiving said slider, said slider capable of sliding within said slider slot; and
   f. said clamping frame and said plate assembly corresponding with the number of said at least two mobile devices meaning a first plate assembly is coupled to a second plate assembly, each of said at least two mobile devices secured by said first tray and said second tray of a first clamping frame assembly and a second clamping frame assembly, respectively, said ring being recessed within said first plate assembly and said ring being raised in said second plate assembly, said ring of said first plate assembly receiving said ring of said second plate assembly, said mounting magnets on said first plate assembly and said second plate assembly being of opposite polarity, said rotation of said first tray assembly or said second tray assembly disengages said mounting magnets until said mounting magnets are rotated enough to engage another of said mounting magnets, said rotation of said first tray assembly allowing usage of said cameras of said at least two mobile devices without obstructions.

2. The system of claim 1, wherein each of said first leg and said second leg each have one of protruding members on a bottom surface thereof.

3. The system of claim 2, wherein said top plate include slots which allow for said protruding members to move within said slots when said first tray is sized.

4. The system of claim 1, wherein said first tray and said second tray each have a curved portion mounted to one end of said first tray.

5. The system of claim 4, wherein said curved portion has a grip holder extending therefrom.

6. The system of claim 5, wherein said grip holder has a plurality of grip openings extending about a length of said grip holder.

7. The system of claim 6, wherein said plurality of grip openings being oriented slantedly on said grip holder and said plurality of grip openings being parallel to each other.

8. The system of claim 6, wherein said clamping frame assembly further includes a grip, said grip being received by said grip holder through said plurality of grip openings.

9. The system of claim 8, wherein said grip has a grip inner side and a grip outer side.

10. The system of claim 9, said grip outer side has hand grips thereon, number of said of hand grips corresponding with said plurality of said grip opening, said hand grips received through said plurality of said grip openings to secure said grip to said grip holder, said hand grips being slatedly oriented on said grip outer side and said hand grips being parallel to each other, said hand grips adapted to allow a user to comfortably handle said dual mobile device apparatus.

11. The system of claim 10, wherein said grip include device grips on said grip inner side, said device grips extending horizontally and being parallel to each other, said device grips adapted to allow securing of said at least two mobile devices to said dual mobile device apparatus without damaging said at least two mobile devices.

12. The system of claim 1, wherein said spring is expanded in a resting position and said spring being compressed when said slider is actuated.

13. The system of claim 1, wherein said top plate, said outer legs, and said bottom plate include fastener openings thereon, said fastener opening receive a fastener therethrough, said fastener securing said top plate, said outer legs and said bottom plate together.

14. A system for a dual mobile device apparatus, comprising:
   a. at least two mobile devices each of said at least two mobile devices having cameras on a rear side thereof;
   b. a clamping frame assembly including a first tray having a first leg and a second leg, each of said first leg and said second leg each having one of protruding members on a bottom surface, said first tray including a plurality of teeth, said plurality of teeth located along an inner edge of said first leg and said second leg, said plurality of teeth on said first leg faces towards said plurality of teeth on said second leg, said first tray having a receiving space, said receiving space defined as the spacing in between said first leg and said second leg, said first tray being U shaped, said first tray having a curved portion mounted thereto, said curved portion having a grip holder extending therefrom, said grip holder having a plurality of grip openings extending about a length of said grip holder, said plurality of grip openings being oriented slantedly on said grip holder and said plurality of grip openings being parallel to each other, said clamping frame assembly further including a grip, said grip being received by said grip holder, said grip having a grip inner side and a grip outer side, said grip outer side having hand grips thereon, said hand grips corresponding with said plurality of said grip opening, said hand grips received through said plurality of said grip openings to secure said grip to said grip holder, said hand grips being slatedly oriented on said grip outer side and said hand grips being parallel to each other, said hand grips adapted to allow a user to comfortably handle said dual mobile device apparatus, said grip including device grips on said grip inner side, said device grips extending horizontally and being parallel to each other, said device grips adapted to allow securing of said at least two mobile devices to said dual mobile device apparatus without damaging said at least two mobile devices;

c. said clamping frame assembly further including a slider, said slider being tapered, said slider having a narrow end and a wide end, said narrow end facing said first tray, said wide end facing away from said first tray, said slider having a finger receiving portion mounted thereon, said finger receiving portion being circular, said finger receiving portion adapted to receive the finger of the user that is engaging said slider, a spring mounted to said wide end of said slider, said spring being S shaped, said slider and said spring being on a same plane, said spring being able to compress and expand, said spring being expanded in a resting position, said spring being compressed when said slider is actuated;

d. said clamping frame assembly further including a second tray, said second tray being W shaped, said second tray including outer legs and inner legs, said outer legs including fastener openings thereon, said inner legs including said plurality of teeth along an outside edge thereof, said plurality of teeth on said inner legs extending away from each respective of said inner legs, a slider receiving space defined as the spacing between said inner legs, said slider receiving space adapted to receive and secure said slider and said spring therein, a first tray receiving space defined between each of said inner legs and said outer legs on each peripheral side of said second tray thereby defining two of said first tray receiving space, said first tray receiving space each adapted to receive one of said first leg or said second leg, said plurality of teeth on said inner legs engage said plurality of teeth on said first and second leg when said spring is expanded to engage said first tray with said second tray, said slider being actuated to compress said spring to allow said slider to move within said slider receiving space to disengage said first tray and said second tray as said plurality of teeth on said first tray disengage said plurality of teeth on said second tray to allow for said first tray to be slid outwardly to allow said dual mobile device apparatus to be sized for each of said at least two mobile devices, said second tray also including said curved portion, said grip holder, said grips similar to said first tray;

e. a plate assembly, said plate assembly including a top plate and a bottom plate, said top plate and said bottom plate including said fastener openings that correspond with said fastener openings on said second tray, said top plate, said bottom plate and said second tray secured together with fasteners through said fastener openings, said top plate including slots which allow for said protruding members to move within said slots when said first tray is sized, said slots guide said protruding members, said bottom plate including a ring centrally located thereon, said bottom plate including magnet openings configured about and around said ring, said bottom plate further including mounting magnets received within said magnet openings, said bottom plate also having a slider slot for receiving said slider, said slider capable of sliding within said slider slot; and f. said clamping frame and said plate assembly corresponding with the number of said at least two mobile devices meaning a first plate assembly is coupled to a second plate assembly, each of said at least two mobile devices secured by said first tray and said second tray of a first clamping frame assembly and a second clamping frame assembly, respectively, said ring being recessed in said first plate assembly and said ring being raised in said second plate assembly, said ring of said first plate assembly receiving said ring of said second plate assembly, said mounting magnets on said first plate assembly and said second plate assembly being of opposite polarity, said rotation of said first tray assembly or said second tray assembly disengages said mounting magnets until said mounting magnets are rotated enough to engage another of said mounting magnets, said rotation of said first tray assembly allowing usage of said cameras of said at least two mobile devices without obstructions.

15. A system for a dual mobile device apparatus, comprising:

a. at least two mobile devices each of said at least two mobile devices having cameras on a rear side thereof;

b. a clamping frame assembly including a first tray, said first tray including a plurality of teeth;

c. said clamping frame assembly further including a slider, said slider having a first end and a second end, said first end facing said first tray, said second end facing away from said first tray, said slider having a finger receiving portion mounted thereon, said finger receiving portion adapted to receive the finger of the user that is engaging said slider, a spring mounted to said second end of said slider, said spring being able to compress and expand;

d. said clamping frame assembly further including a second tray, said second tray including said plurality of teeth, first tray and said second tray being mounted together when said plurality of teeth on said first tray engage said plurality of teeth on said second tray, said slider being actuated to compress said spring to allow said slider to move within said slider receiving space to disengage said first tray and said second tray;

e. a plate assembly, said plate assembly including a top plate and a bottom plate, said bottom plate including a ring centrally located thereon, said bottom plate further including mounting magnets, said bottom plate also having a slider slot for receiving said slider, said slider capable of sliding within said slider slot; and f. said clamping frame and said plate assembly corresponding with the number of said at least two mobile devices meaning a first plate assembly is coupled to a second plate assembly, each of said at least two mobile devices secured by said first tray and said second tray of a first clamping frame assembly and a second clamping frame assembly, respectively, said ring being recessed within said first plate assembly and said ring being raised in said second plate assembly, said ring of said first plate assembly receiving said ring of said second plate assembly, said mounting magnets on said first plate assembly and said second plate assembly being of opposite polarity, said rotation of said first tray assembly or said second tray assembly disengages said mounting magnets until said mounting magnets are rotated enough to engage another of said mounting magnets, said rotation of said first tray assembly allowing usage of said cameras of said at least two mobile devices without obstructions.

* * * * *